David Whisler's Ditching Plow.

No. 72953

PATENTED
DEC 31 1867

Witnesses: Jno. A. Ellis, Jos. White

Inventor: David Whisler

United States Patent Office.

DAVID WHISLER, OF UNION TOWNSHIP, OHIO.

Letters Patent No. 72,953, dated December 31, 1867.

IMPROVEMENT IN DITCHING-MACHINES.

*The Schedule referred to in these Letters Patent and making part of the same.*

TO ALL WHOM IT MAY CONCERN:

Be it known that I, DAVID WHISLER, of Union township, in the county of Hancock, and State of Ohio, have invented certain new and useful Improvements in Ditching-Machines; and I do hereby declare that the following is a full, clear, and exact description thereof, reference being had to the accompanying drawings, and to the letters of reference marked thereon, which form a part of this specification. In the drawings annexed, which make a part of this specification—

Figure 1:
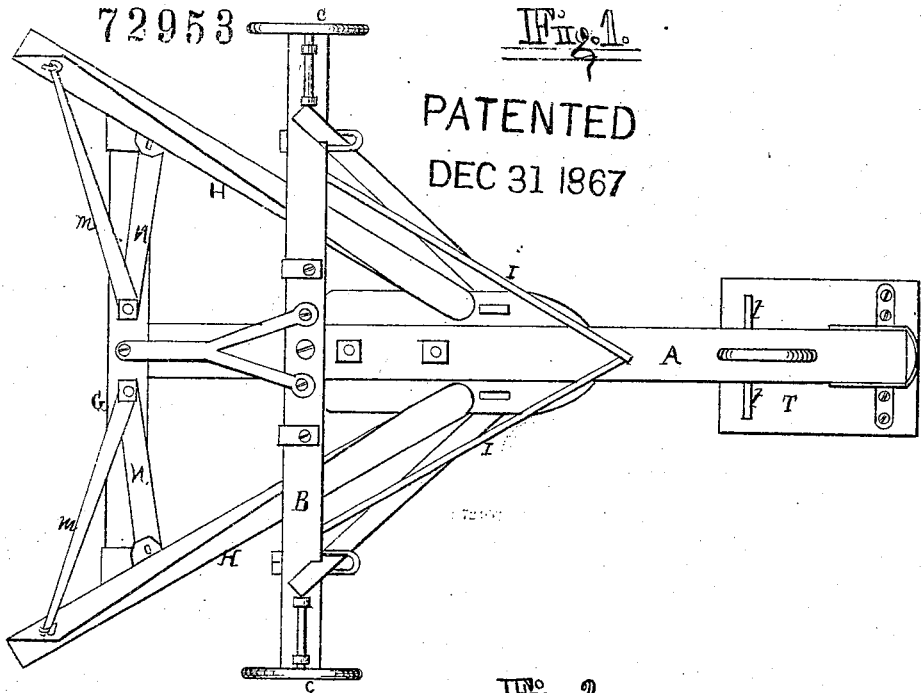
Figure 1 represents a plan view of my ditching-plough.
Figure 2:
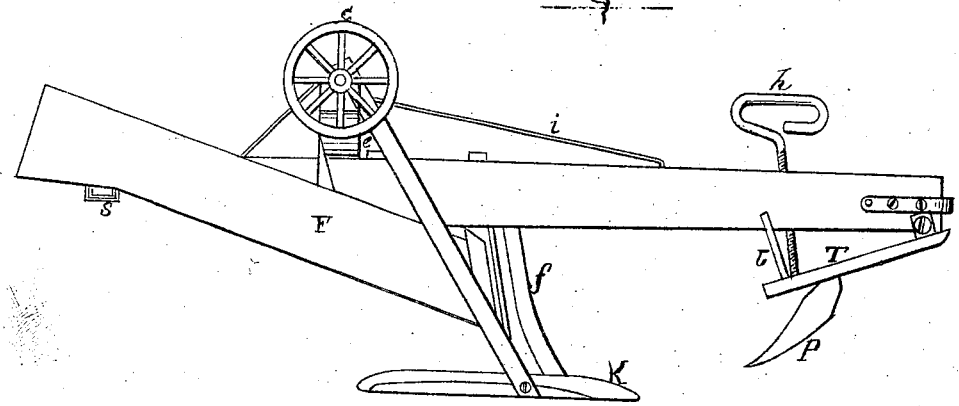
Figure 2 is a side elevation of the same.

The letter A designates the beam, and B a cross-bar, to which the axles of wheels C C are attached by staples. The cross-bar B is supported by the block $e$, which rests on the beam A. F represent two metal plates, one being fastened to each side of the standard, and thereby hiding the standard from view. The plates F extend beyond the rear end of the plough-beam, and rest against the cross-piece G, into which the plough-beam is mortised. To hold the plates F in position, the straps $m$ $m$ and $n$ $n$ are provided; the straps $m$ $m$ confining the ends of the said plates to cross-piece G, and the straps $n$ $n$ confining the centre of the plates to cross-bar B. The plates F occupy nearly a vertical position, and each is furnished with the metal wing H, which decline at small angle from plates F. The wings H are supported at their lower ends by the shovel K, to which they are fastened, and near their upper ends they rest on the iron bars, the said bars being fastened to the lower side of cross-piece G by metal bands. The shovel K is held in a firm position by an iron strip on each side, the upper ends of said strips being secured by staples to cross-bar B. The under side of plough or shovel K should be scooped out as represented in fig. 2. $i$ $i$ represent two iron rods, which bind cross-bar B to beam A. T represents a small platform, which is made adjustable, by being hinged at one end to beam A, while the opposite end may be raised or lowered by the screw $h$. The platform T will be held in the required position by the springs $t$. The object of this platform is to regulate the depth of the plough in the soil. To the bottom of platform T is secured, in a vertical position, the knife P, for the purpose of cutting roots near the surface of the earth. $f$ designates a coulter, placed in front of the standard, for the purpose of cutting roots. The object of the wheels C is to facilitate the removing of my ditcher by reversing it, so that the wheels will rest on the ground.

Having thus described my invention, what I claim, and desire to secure by Letters Patent, is—

1. The hinged platform T, for regulating the depth of the furrow or ditch, substantially as described.
2. In combination with the above, I claim screw $h$ and springs $t$, substantially as set forth.
3. I claim axle B, wheels C C, beam A, platform T, screw $h$, springs $t$, and vertical knife P, all combined and arranged as and for the purpose set forth and described.

In testimony that I claim the foregoing as my own, I affix my signature in presence of two witnesses.

DAVID WHISLER.

Witnesses:
J. B. HALL,
WILLIAM WILSON.